(12) United States Patent
Bang et al.

(10) Patent No.: US 12,069,035 B2
(45) Date of Patent: Aug. 20, 2024

(54) DEVICE IN NETWORK

(71) Applicant: UNIONPLACE CO., LTD., Seoul (KR)

(72) Inventors: Seongcheol Bang, Seoul (KR); Youngkyu Shin, Seoul (KR); Seunggyeom Kim, Seoul (KR)

(73) Assignee: UNIONPLACE CO., LTD., Seoul (KR)

( * ) Notice: Subject to any disclaimer, the term of this patent is extended or adjusted under 35 U.S.C. 154(b) by 210 days.

(21) Appl. No.: 17/951,677

(22) Filed: Sep. 23, 2022

(65) Prior Publication Data

US 2023/0114198 A1 Apr. 13, 2023

Related U.S. Application Data

(63) Continuation of application No. PCT/KR2022/009392, filed on Jun. 30, 2022.

(30) Foreign Application Priority Data

Sep. 29, 2021 (KR) .................. 10-2021-0128647

(51) Int. Cl.
 *H04L 29/06* (2006.01)
 *H04L 9/40* (2022.01)
(52) U.S. Cl.
 CPC .......... *H04L 63/06* (2013.01); *H04L 63/0428* (2013.01)
(58) Field of Classification Search
 None
 See application file for complete search history.

(56) References Cited

U.S. PATENT DOCUMENTS

| 5,793,940 | A | * | 8/1998 | Tajima | .................. | H04L 9/0618 714/1 |
| 8,006,284 | B2 | * | 8/2011 | Ayatsuka | ............ | H04L 63/0853 713/1 |

(Continued)

FOREIGN PATENT DOCUMENTS

| JP | H 05-333772 A | 12/1993 |
| JP | H 10-065663 A | 3/1998 |

(Continued)

OTHER PUBLICATIONS

Korean Office Action mailed Jan. 12, 2022, issued to Korean Application No. 10-2021-0128647.

(Continued)

*Primary Examiner* — Maung T Lwin
(74) *Attorney, Agent, or Firm* — Stein IP, LLC

(57) ABSTRACT

According to one aspect of the technique of the present disclosure, there is provided a device in a network including: a storage in a secure zone to store encryption algorithms, information generators, and keys; and an operation processor in the secure zone. When the device operates as a master device, the operation processor selects at least one of an encryption algorithm, an information generator or a key used for encrypted communication within the network, generates profile information including at least one of identification information of the encryption algorithm, the information generator or the key, and transmits the profile information to another device in the network. When the device does not operate as the master device, the operation processor receives the profile information from the master device, and designates based thereon at least one of the encryption algorithm, the information generator or the key used for the encrypted communication.

20 Claims, 7 Drawing Sheets

(56) References Cited

U.S. PATENT DOCUMENTS

| | | | | |
|---|---|---|---|---|
| 8,218,769 | B2* | 7/2012 | Takata | H04L 63/065 380/247 |
| 8,607,301 | B2* | 12/2013 | Carrasco | H04L 63/08 380/278 |
| 10,057,765 | B2* | 8/2018 | Hwang | H04W 12/04 |
| 2008/0082822 | A1* | 4/2008 | Starrett | H04L 9/0825 713/171 |
| 2018/0145948 | A1* | 5/2018 | Kim | H04L 63/0236 |

FOREIGN PATENT DOCUMENTS

| | | |
|---|---|---|
| KR | 10-2007-0066835 A | 6/2007 |
| KR | 10-2010-0037518 A | 4/2010 |
| KR | 10-2016-0028939 A | 3/2016 |
| KR | 10-1688118 B1 | 12/2016 |
| KR | 10-2017-0012957 A | 2/2017 |
| KR | 10-2018-0073015 A | 7/2018 |
| KR | 10-2019-0135001 A | 12/2019 |
| KR | 10-2020-0135127 A | 12/2020 |
| KR | 10-2377265 B1 | 3/2022 |
| WO | WO 2017/122361 A1 | 7/2017 |

OTHER PUBLICATIONS

Notice of Reasons for Refusal dated Dec. 26, 2023, issued to the corresponding Japanese Patent Application No. 2022-558153.

* cited by examiner

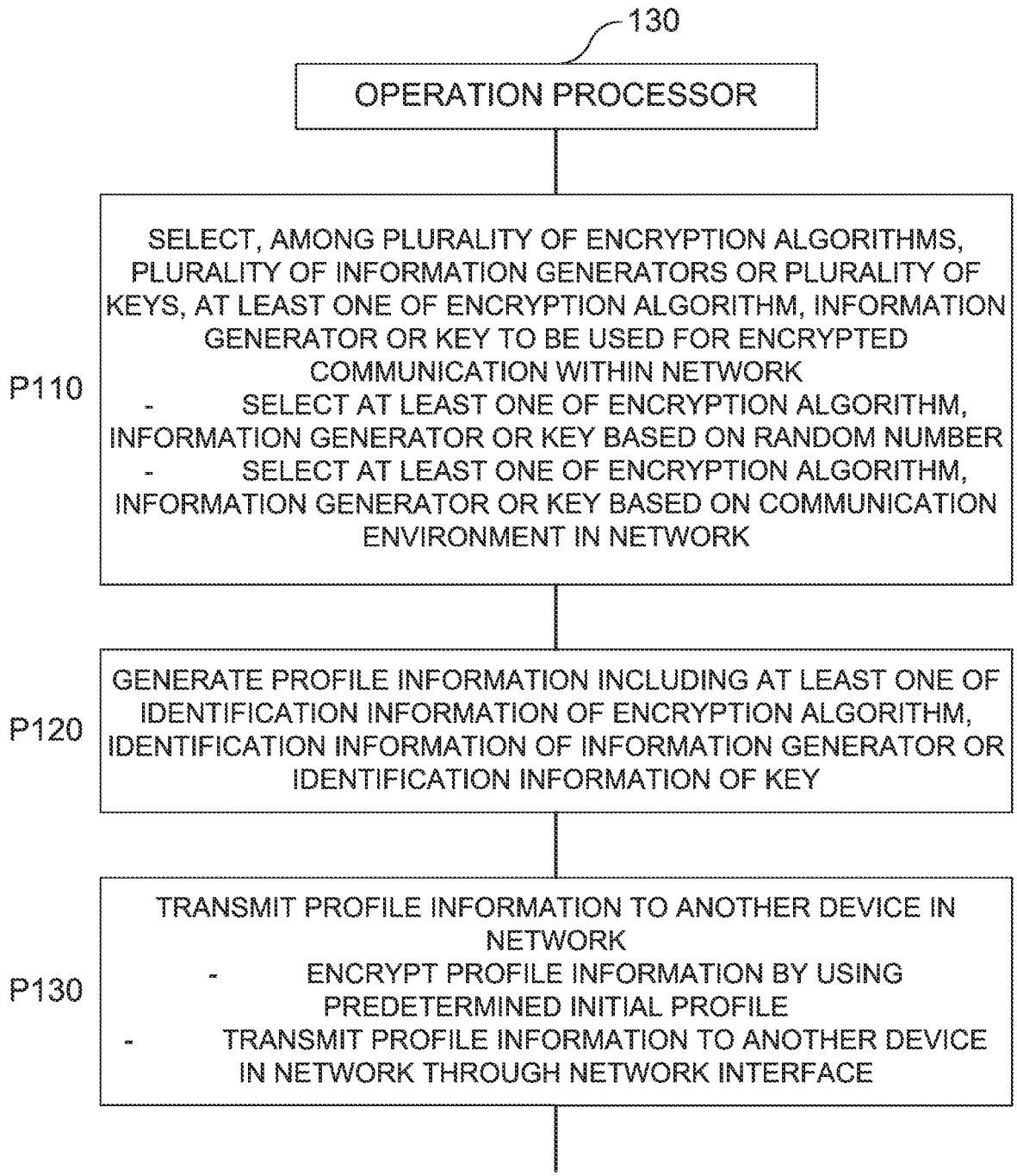

FIG. 4

| #1 | ENCRYPTION_ALGORITHM-A |
|----|------------------------|
| #2 | ENCRYPTION_ALGORITHM-B |
| #3 | ENCRYPTION_ALGORITHM-C |
| #4 | ENCRYPTION_ALGORITHM-D |
| #5 | ENCRYPTION_ALGORITHM-E |
| #6 | ENCRYPTION_ALGORITHM-F |
| ⋮ | ⋮ |
| ⋮ | ⋮ |
| ⋮ | ⋮ |

111

110

| #1 | INFORMATION_GENERATOR-A |
|----|-------------------------|
| #2 | INFORMATION_GENERATOR-B |
| #3 | INFORMATION_GENERATOR-C |
| #4 | INFORMATION_GENERATOR-D |
| #5 | INFORMATION_GENERATOR-E |
| #6 | INFORMATION_GENERATOR-F |
| ⋮ | ⋮ |

113

| #1 | KEY-A |
|----|-------|
| #2 | KEY-B |
| #3 | KEY-C |
| #4 | KEY-D |
| #5 | KEY-E |
| #6 | KEY-F |
| ⋮ | ⋮ |
| ⋮ | ⋮ |

115

MASTER KEY — 117

PROFILE_INFORMATION-1 — 119

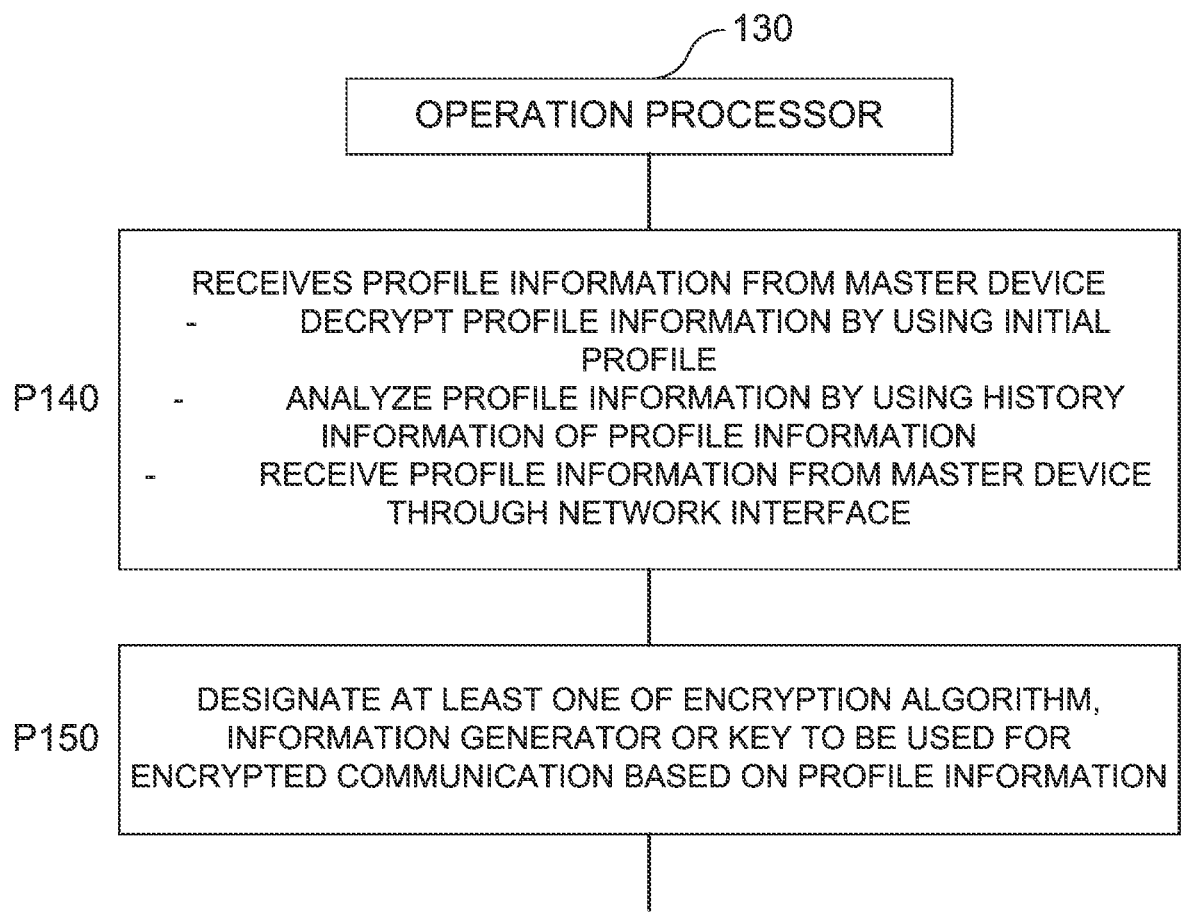

FIG. 7

| 110 | 111 |
|---|---|
| #1 | ENCRYPTION_ALGORITHM-F |
| #2 | ENCRYPTION_ALGORITHM-C |
| #3 | ENCRYPTION_ALGORITHM-A |
| #4 | ENCRYPTION_ALGORITHM-B |
| #5 | ENCRYPTION_ALGORITHM-D |
| #6 | ENCRYPTION_ALGORITHM-E |
| ⋮ | ⋮ |
| ⋮ | ⋮ |
| ⋮ | ⋮ |

| | 113 |
|---|---|
| #1 | INFORMATION_GENERATOR-C |
| #2 | INFORMATION_GENERATOR-A |
| #3 | INFORMATION_GENERATOR-F |
| #4 | INFORMATION_GENERATOR-D |
| #5 | INFORMATION_GENERATOR-B |
| #6 | INFORMATION_GENERATOR-E |
| ⋮ | ⋮ |

| | 115 |
|---|---|
| #1 | KEY-B |
| #2 | KEY-F |
| #3 | KEY-A |
| #4 | KEY-C |
| #5 | KEY-E |
| #6 | KEY-D |
| ⋮ | ⋮ |
| ⋮ | ⋮ |

117
MASTER KEY

| 119 |
|---|
| PROFILE_INFORMATION-1 |
| PROFILE_INFORMATION-2 |
| PROFILE_INFORMATION-3 |
| PROFILE_INFORMATION-4 |

DEVICE IN NETWORK

CROSS-REFERENCE TO RELATED PATENT APPLICATION

This application is a bypass continuation of International Application No. PCT/KR2022/009392, filed on Jun. 30, 2022, in the WIPO, and Korean Patent Application No. 10-2021-0128647, filed on Sep. 29, 2021, in the Korean Intellectual Property Office, the entire contents of which are hereby incorporated by reference.

BACKGROUND

1. Field

The present disclosure relates to a device in a network.

The technique disclosed herein was supported by Korea Evaluation Institute of Industrial Technology (KEIT) grant funded by the Korea government (the Ministry of Trade, Industry and Energy (MOTIE)) (Project name: "Development Intelligent Object on AI Applet MCU for High Speed Secure Network," Project No.: 1415180947).

2. Related Art

With development of computing technology and communication technology, various devices may be connected to a network. For example, various devices such as personal computers, mobile communication terminals, refrigerators, air conditioners and televisions may be connected to a home network. Further, for example, various devices such as production facilities, work computers and sensors may be connected to a network installed in a production site. Furthermore, for example, according to Internet of Things (IoT) technology, various devices such as wearable devices and sensors may be additionally connected to the network. Hereinafter, in the present specification, a device having a communication function and a computing function is simply referred to as a "device."

In order to enhance the security of the device, the device may be implemented by using, for example, a semiconductor element such as a processor having a secure zone and a normal zone. The secure zone may also be referred to as a trust zone.

For example, Korean Patent Application Publication No. 10-2017-0012957 (Patent document 1) entitled "Security network system and data processing method therefor" filed by Samsung Electronics Co., Ltd. and published on Feb. 6, 2017, discloses a technique in which a processor that is selectively operable in either the normal zone (referred to as a "normal world" in Patent document 1) or a secure zone (referred to as a "secure world" in Patent document 1) is used.

Meanwhile, since the device is connected to the network such as the Internet, it may be exposed to malicious attacks such as hacking attacks. Accordingly, Internet-based security protocols such as transport layer security (TLS) and datagram transport layer security (DTLS) may be applied to encrypt data and transmit/receive the encrypted data between devices.

According to a TLS protocol, a first device and a second device in a network perform mutual authentication based on a public key, and a secret key (a symmetric key) is generated to be shared between the first device and the second device. Then, the first device transmits and receives data encrypted with the secret key to and from and the second device.

For example, Korean Patent Application Publication No. 10-2018-0073015 (Patent document 2) entitled "Method of performing secure communication between devices" filed by Samsung Electronics Co., Ltd. and published on Jul. 2, 2018, discloses a technique of a handshake operation between a first device and a second device.

Specifically, in order to form a security session, various messages such as "Client_Hello," "Server_Hello," "Server_Key_Exchange," "Certificate_Request," "Server_Hello_Done," "Client_Certificate," "Client_Key_Exchange," "Certificate_Verify," "Client_Finished" and "Server_Finished" are transmitted and received between the first device and the second device.

When the handshake operation is performed to apply the security protocol such as TLS between the first device and the second device, there are disadvantages as follows:

At first, the first device and the second device transmit and receive the various messages described above during the handshake operation. Therefore, it is necessary to transmit and receive such a large amount of messages between the first device and the second device for the handshake operation and, thus, the handshake operation takes a long time to complete.

Further, since the first device and the second device transmit and receive a secret key (a symmetric key) for encrypted communication based on a public key (PKI) in the handshake operation, the first device and the second device may transmit and receive the secret key at a high-security level. However, in the subsequent communication, the first device and the second device use the secret key that is the symmetric key to encrypt data and transmit and receive the encrypted data. Thus, the data is transmitted and received at a low-security level. Therefore, when the secret key is illegitimately extracted, data communication between the first device and the second device is vulnerable to malicious attacks such as hacking attacks.

Further, when the security session between the first device and the second device formed through the handshake operation is terminated, a new security session needs to be formed for the next data communication by performing the handshake operation again between the first device and the second device.

Furthermore, as the number of devices in the network increases, the time required for the handshake operation also increases significantly. That is, since the handshake operation is performed for each of a plurality of devices in the network, the time required for the handshake operation also greatly increases.

RELATED ART

[Patent Document]
  Patent document 1: Korean Patent Application Publication No. 10-2017-0012957
  Patent document 2: Korean Patent Application Publication No. 10-2018-0073015

SUMMARY

It is an object of the technique of the present disclosure to provide a device in a network capable of, by using profile information to be used for encrypted communication, minimizing a message transmitting process required for a handshake operation and a time required for the handshake operation, dynamically changing an encryption scheme, easily changing policy information such as validity period information and QoS information, and easily and quickly sharing the profile information between a plurality of devices in the network.

In view of the above, according to one aspect of the technique of the present disclosure, there is provided a device in a network where a plurality of devices are connected, the device including: a storage disposed in a secure zone and configured to store a plurality of encryption algorithms, a plurality of information generators and a plurality of keys; and an operation processor disposed in the secure zone, wherein, when the device operates as a master device in the network, the operation processor is configured to: (a) select, among the plurality of encryption algorithms, the plurality of information generators and the plurality of keys, at least one of an encryption algorithm, an information generator or a key to be used for encrypted communication within the network; (b) generate profile information including at least one of identification information of the encryption algorithm, identification information of the information generator or identification information of the key; and (c) transmit the profile information to another device among the plurality of devices in the network, and wherein, when the device does not operate as the master device in the network, the operation processor is configured to: (d) receive the profile information from the master device; and (e) designate, based on the profile information, at least one of the encryption algorithm, the information generator or the key to be used for the encrypted communication.

According to the technique of the present disclosure, by using the profile information to be used for encrypted communication, it is possible to minimize a message transmitting process required for a handshake operation and a time required for the handshake operation, dynamically change an encryption scheme, easily change policy information such as validity period information and QoS information, and easily and quickly share the profile information between a plurality of devices in the network.

BRIEF DESCRIPTION OF THE DRAWINGS

FIG. 3 is a diagram illustrating an example of processes performed by an operation processor of the device in the network according to the exemplary embodiment of the technique of the present disclosure.

FIG. 4 is a diagram illustrating an exemplary configuration of a storage of the device in the network according to the exemplary embodiment of the technique of the present disclosure.

FIG. 5 is a diagram illustrating another example of processes performed by the operation processor of the device in the network according to the exemplary embodiment of the technique of the present disclosure.

FIG. 7 is a diagram illustrating a state in which the device in the network according to the exemplary embodiment of the technique of the present disclosure arranges and stores a plurality of encryption algorithms, a plurality of information generators, and a plurality of keys in the storage thereof based on their identification information.

DETAILED DESCRIPTION

Embodiments

Figure 1:
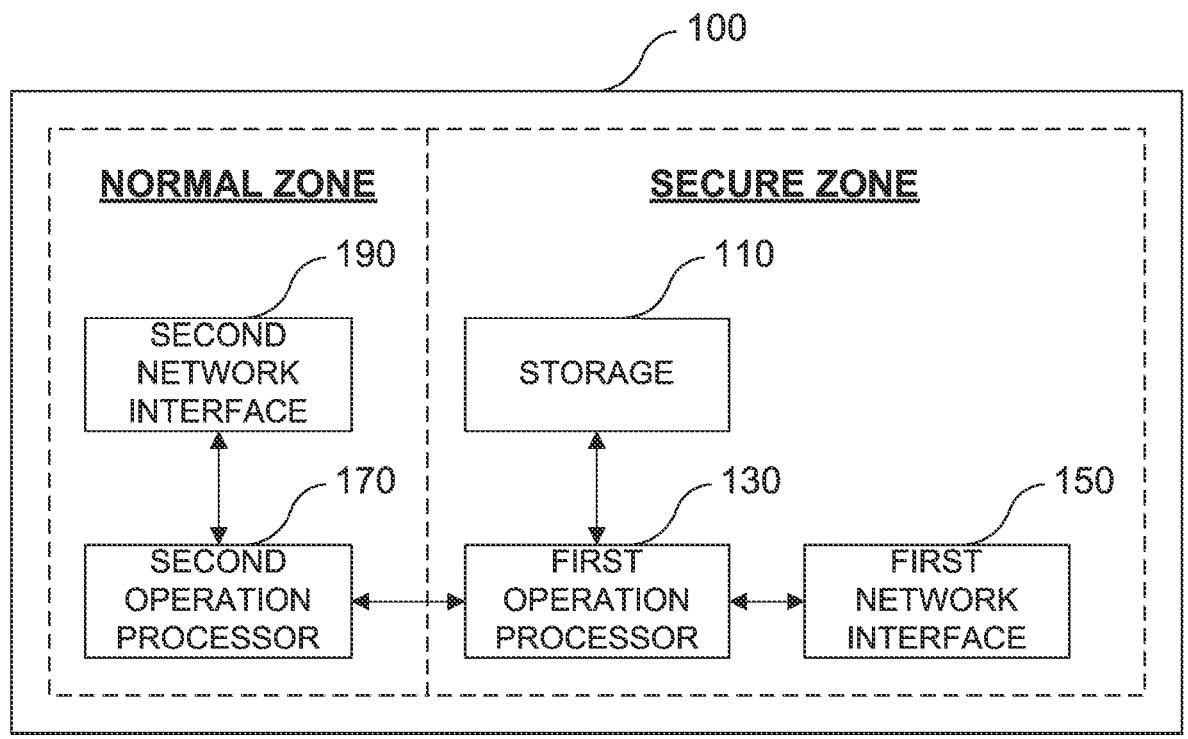
FIG. 1 is a diagram illustrating an exemplary configuration of a device in a network according to an exemplary embodiment of the technique of the present disclosure.

Hereinafter, one or more embodiments (also simply referred to as "embodiments") of a device in a network according to the technique of the present disclosure will be described in detail with reference to the accompanying drawings. Meanwhile, in the drawings for describing the embodiments of the technique of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

An exemplary embodiment of a device in a network according to the technique of the present disclosure will be described in detail below.

Figure 2:
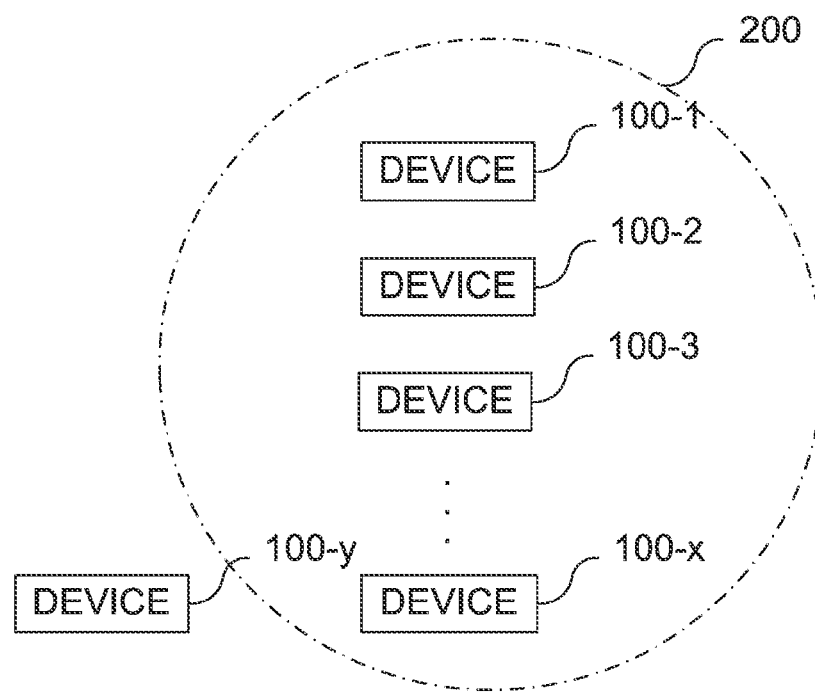
FIG. 2 is a diagram illustrating an exemplary configuration of the network including the device according to the exemplary embodiment of the technique of the present disclosure.

FIG. 1 is a diagram illustrating an exemplary configuration of a device 100 in a network 200 according to the exemplary embodiment of the technique of the present disclosure, and FIG. 2 is a diagram illustrating an exemplary configuration of the network 200 including the device 100.

Referring to FIG. 1, the device 100 includes a storage 110, a first operation processor 130, a first network interface 150, and a second operation processor 170, and a second network interface 190.

The device 100 according to the exemplary embodiment of the technique of the present disclosure has a communication function and a computing function. The device 100 may be implemented by using, for example, a semiconductor device such as a central processing unit (CPU). More specifically, the device 100 may be implemented by using a semiconductor device having a normal zone and a secure zone. The storage 110 in the device 100 may be implemented by using, for example, a semiconductor device such as a semiconductor memory. Each of the first operation processor 130 and the second operation processor 170 in the device 100 may be implemented by using a semiconductor device such as an arithmetic logic unit. Each of the first network interface 150 and the second network interface 190 in the device 100 may be implemented by using a semiconductor device such as a communication logic unit.

As described above, the device 100 may be implemented in various forms such as a personal computer, a mobile communication terminal, a refrigerator, an air conditioner, a television, a production facility, a work computer, a wearable device, and a sensor. For example, in FIG. 2 showing examples of the device 100 according to the exemplary embodiment of the technique of the present disclosure, a device 100-1 may be disposed in the work computer, a device 100-2 may be disposed in the production facility, a device 100-3 may be disposed in the sensor, a device 100-x (where x is a natural number greater than 3) may be disposed in the mobile communication terminal. Although the devices 100-1 to 100-x are implemented in different forms, each of the devices 100-1 to 100-x includes the storage 110, the first operation processor 130, the first network interface 150, the second operation processor 170, and the second network interface 190 according to the exemplary embodiment of the technique of the present disclosure. The storage 110, the first operation processor 130, the first network interface 150, the second operation processor 170, and the second network interface 190 may form one or more semiconductor devices to be installed in each of apparatuses such as the work computer, the production facility, the sensor, and the mobile communication terminal. Alternatively, the storage 110, the first operation processor 130, the first network interface 150, the second operation processor 170, and the second network interface 190 may be included in, for example, a USB memory or a subscriber identity module (SIM) to be connected to each of apparatuses such as the work computer, the production facility, the sensor, and the mobile communication terminal.

The storage 110, the first operation processor 130, and the first network interface 150 are disposed in the secure zone. Hereinafter, the first operation processor 130 may be simply referred to as an operation processor 130, and the first network interface 150 may be simply referred to as a network interface 150.

The second operation processor 170 and the second network interface 190 are disposed in the normal zone.

First, the second operation processor 170 and the second network interface 190 disposed in the normal zone will be described.

The second network interface 190 is an interface for communication. For example, the second network interface 190 of the device 100-1 shown in FIG. 2 is configured to communicate with the second network interfaces 190 of the devices 100-2 to 100-x.

For example, the second operation processor 170 processes data received through the second network interface 190 and transmits the processed data to the operation processor 130 disposed in the secure zone. Further, the second operation processor 170 receives and processes data transmitted from the operation processor 130.

Hereinafter, the storage 110, the operation processor 130, and the network interface 150 disposed in the secure zone will be described in more detail.

The storage 110 is disposed in the secure zone and stores a plurality of encryption algorithms ('111' in FIG. 4), a plurality of information generators ('113' in FIG. 4), and a plurality of keys ('115' in FIG. 4).

The plurality of encryption algorithms 111, the plurality of information generators 113, and the plurality of keys 115 may be stored in advance in the storage 110 by, for example, a manufacturer of the device 100. At least one of the plurality of encryption algorithms 111, the plurality of information generators 113 or the plurality of keys 115 may be changed and stored in the storage 110 by, for example, an administrator of the network 200.

The operation processor 130 is disposed in the secure zone. A specific configuration of the operation processor 130 will be described later.

The network interface 150 is disposed in the secure zone and is an interface for higher-level secure communication. For example, the network interface 150 of the device 100-1 shown in FIG. 2 is configured to perform secure communication with the network interfaces 150 of the devices 100-2 to 100-x.

FIG. 3 is a diagram illustrating an example of processes performed by the operation processor 130 of the device 100 in the network according to the exemplary embodiment of the technique of the present disclosure, FIG. 4 is a diagram illustrating an exemplary configuration of the storage 110 of the device 100 in the network according to the exemplary embodiment of the technique of the present disclosure, and FIG. 5 is a diagram illustrating another example of processes performed by the operation processor 130 of the device 100 in the network according to the exemplary embodiment of the technique of the present disclosure.

Hereinafter, the configuration of the operation processor 130 will be described in more detail.

Referring to FIG. 2, a plurality of devices, e.g., the devices 100-1 to 100-x are arranged in the network 200. One of the devices 100-1 to 100-x may be determined as a "master device." The master device is configured to generate profile information to be described later and transmit the profile information to other devices.

For example, in the network 200, the device 100-1 may operate as the master device. In this case, the devices 100-2 to 100-x receive profile information from the device 100-1 that is the master device. As another example, in the network 200, the device 100-2 may operate as the master device. In this case, the device 100-1 and the devices 100-3 to 100-x receive profile information from the device 100-2 that is the master device.

The device 100 may refer to any one of the devices 100-1 to 100-x.

In the case that the device 100 operates as the master device in the network, the operation processor 130 may perform the following processes.

Referring to FIG. 3, the operation processor 130 selects, among the plurality of encryption algorithms 111, the plurality of information generators 113, and the plurality of keys 115, at least one of an encryption algorithm, an information generator or a key to be used for encrypted communication within the network 200 (process P110).

Referring to FIG. 4, for example, the plurality of encryption algorithms 111 such as an "encryption_algorithm-A," an "encryption_algorithm-B," an "encryption_algorithm-C," an "encryption_algorithm-D," an "encryption_algorithm-E," and an "encryption_algorithm-F," the plurality of information generators 113 such as an "information_generator-A," an "information_generator-B," an "information_generator-C," an "information_generator-D," an "information_generator-E," and an "information_generator-F," and the plurality of keys 115 such as a "key-A," a "key-B," a "key-C," a "key-D," a "key-E," and a "key-F," are stored in advance in the storage 110.

For example, encryption algorithms such as advanced encryption standard (AES), data encryption standard (DES), Rivest's Cipher version 2 (RC2), Rivest's Cipher version 4 (RC4), triple data encryption standard (TripleDES), Government standard (GOST), secure hash algorithm (SHA), modification detection code (MDC), Rivest-Shamir-Adleman (RSA), digital signature algorithm (DSA), and Elliptic Curve may be stored in the storage 110 as the plurality of encryption algorithms 111.

For example, information generators such as a random number generator, an identification information generator, a key generator, and a policy generator may be stored in the storage 110 as the plurality of information generators 113.

For example, keys such as symmetric keys and/or asymmetric keys may be stored in the storage 110 as the plurality of keys 115.

In the process P110, the operation processor 130 selects at least one of the encryption algorithm, the information generator or the key to be used for encrypted communication within the network 200. For example, the operation processor 130 may select the "encryption_algorithm-B," the "information_generator-A," and the "key-D" to be used for encrypted communication.

Next, the operation processor 130 generates profile information including at least one of identification information of the encryption algorithm, identification information of the information generator or identification information of the key, which is selected through the process P110 (process P120).

For example, in the case that the encryption_algorithm-B, the information_generator-A, and the key-D are selected through the process P110, the profile information may be in the form of, for example, "G #1, A #2, K #4." "G #1" indicates that the identification information of the selected information generator is "#1." "A #2" indicates that the identification information of the selected encryption algorithm is "#2." "K #4" indicates that the identification information of the selected key is "#4."

For example, in the case that the encryption_algorithm-B and the key-D are selected through the process P110, the profile information may be in the form of, for example, "A #2, K #4."

For example, in the case that the information_generator-A is selected through the process P110, the profile information may be in the form of, for example, "G #1."

Next, the operation processor 130 transmits the profile information generated in the process P120 to other devices except for the device 100 among the plurality of devices in the network 200 (process P130). For example, in the case that the device 100-1 is the master device, the device 100-1 transmits the profile information generated in the process P120 to the devices 100-2 to 100-*x*.

In the case that the device 100 does not operate as the master device in the network, the operation processor 130 may perform the following processes.

Referring to FIG. 5, the operation processor 130 receives profile information from the master device that is not the device 100 (process P140).

As described above, the profile information includes at least one of identification information of an encryption algorithm, identification information of an information generator or identification information of a key to be used for encrypted communication.

Next, the operation processor 130 designates at least one of the encryption algorithm, the information generator or the key to be used for the encrypted communication based on the profile information received through the process P140 (process P150).

That is, the operation processor 130 designates at least one of the encryption algorithm, the information generator or the key to be used for the encrypted communication based on at least one of the identification information of the encryption algorithm, the identification information of the information generator or the identification information of the key that are included in the profile information.

Accordingly, in the case that the device 100 operates as the master device, the device 100 may transmit profile information including at least one of identification information of an encryption algorithm, identification information of an information generator or identification information of a key to be used for encrypted communication with other devices in the network 200. On the other hand, in the case that the device 100 does not operate as the master device, the device 100 may receive the profile information from the master device (that is not the device 100) in the network 200. Therefore, the plurality of devices in the network 200 may perform encrypted communication based on the profile information without performing the complex handshake operation.

Meanwhile, referring back to FIG. 3, the process P110 may include a process of selecting at least one of an encryption algorithm, an information generator or a key to be used for encrypted communication based on a random number.

For example, one of the plurality of information generators may operate as a random number generator. In this case, the operation processor 130 may select at least one of an encryption algorithm, an information generator or a key to be used for encrypted communication by using the random number generator.

For example, in the case that "2, 1, 4" are selected by the random number generator, the operation processor 130 selects the "encryption_algorithm-B" corresponding to the random number "2," the "information_generator-A" corresponding to the random number "1," and the "key-D" corresponding to the random number "4," so that the encryption_algorithm-B, the information_generator-A, and the key-D are used for encrypted communication.

Further, referring to FIG. 3, the process P110 may include a process of selecting at least one of an encryption algorithm, an information generator or a key to be used for encrypted communication based on a communication environment in the network 200.

For example, in the case that the communication environment in the network 200 requires the use of a lightweight encryption algorithm and a short length of key, the operation processor 130 may select, among the plurality of encryption algorithms 111 and the plurality of keys 115, the most lightweight encryption algorithm and the shortest length of key to be used for encrypted communication.

Further, referring to FIG. 3, the process P130 may include a process of encrypting profile information by using a predetermined initial profile, and, referring to FIG. 5, the process P140 may include a process of decrypting the profile information by using the predetermined initial profile.

In order to prevent malicious attacks such as hacking attacks, it is preferable that the profile information is encrypted and, then, the encrypted profile information is transmitted and received in the network 200.

For example, in an initial state where the devices 100-1 to 100-*x* are included in the network 200, the devices 100-1 to 100-*x* may not know which encryption algorithm and key are used to encrypt or decrypt the profile information. In other words, there may be the case that the master device among the plurality of devices does not know which encryption algorithm and key are used to encrypt the profile information, and also other devices except for the master device among the plurality of devices do not know which encryption algorithm and key are used to encrypt the profile information.

Accordingly, an initial profile may be designated in advance, and the devices 100-1 to 100-*x* may encrypt or decrypt the profile information with the initial profile.

That is, the master device may encrypt the profile information by using the initial profile, and the other devices may decrypt the profile information by using the initial profile.

The initial profile may preferably include at least one of unique identification information of an encryption algorithm, unique identification information of an information generator or unique identification information of a key, and more preferably, at least the unique identification information of the encryption algorithm or the unique identification of the key.

For example, if the initial profile includes the encryption_algorithm-A and the key-E, the devices 100-1 to 100-x may encrypt or decrypt the profile information by using the encryption_algorithm-A and the key-E.

The initial profile is preferably stored in advance in the storage 110 of the device 100. Alternatively, the initial profile may be predefined by an arithmetic logic unit of the operation processor 130.

Further, for example, when a device 100-y (y is a natural number greater than x) newly joins the network 200, the device 100-y may not know which encryption algorithm and key were used to encrypt the profile information. In this case, as described above, an initial profile may be designated in advance; the master device may transmit profile information encrypted with the initial profile to the device 100-y; and the device 100-y may decrypt the encrypted profile information with the initial profile.

The profile information may further include a master key 117.

The master key 117 is used to generate (or derive) a key. For example, the administrator of the network 200 may store the master key 117 in the storage 110 of the device 100. That is, the plurality of devices, i.e., the devices 100-1 to 100-x in the network 200 have the same master key 117.

For example, in the case that the device 100 receives profile information from the master device, the operation processor 130 in the device 100 may compare the master key 117 included in the profile information with the master key 117 stored in the device 100. If the master key 117 included in the profile information and the master key 117 stored in the device 100 are the same, the device 100 operates normally. If the master key 117 included in the profile information and the master key 117 stored in the device 100 are not the same, the device 100 may stop operating without performing any additional operation.

Thus, for example, even if a malicious user gains access to the device 100, the device 100 does not operate normally when there is no master key 117 stored by the administrator of the network 200 in the device 100 or when a mater key different from the master key 117 is stored in the device 100. In particular, when the device 100-y newly joins the network 200, the operation processor 130 of the device 100-y may compare the master key 117 included in the profile information with the master key 117 stored in the device 100-y. Accordingly, the security of the network 200 may be improved.

Further, referring back to FIG. 5, a process P140 may include a process of analyzing profile information by using history information of the profile information.

The history information of the profile information ("119" in FIG. 4 and "119" in FIG. 7) is information that includes the history of the profile information in the network 200 and is, for example, stored in the storage 110.

For example, the "profile_information-1" indicates first profile information that is already used in the network 200. "Profile_information-2" of FIG. 7, which will be described later, indicates second profile information that is already used in the network 200, and "profile_information-3" indicates third profile information that is already used in the network 200. "Profile_information-4" of FIG. 7 indicates, for example, fourth profile information to be used in the network 200.

As will be described later, identification information of each of the plurality of encryption algorithms 111, identification information of each of the plurality of information generators 113, and identification information of each of the plurality of keys 115 may be changed. Further, as will be described later, the plurality of keys 115 may be newly generated.

For example, in the case that the plurality of encryption algorithms 111, the plurality of information generators 113, and the plurality of keys 115 are stored in the storage 110 as shown in FIG. 4 and the "profile_information-1" is "A #2, K #4," the "profile_information-1" indicates the "encryption_algorithm-B" and the "key-D."

However, in the case that the plurality of encryption algorithms 111, the plurality of information generators 113, and the plurality of keys 115 are stored in the storage 110 as shown in FIG. 7 and the "profile_information-4" is "A #2, K #4," the "profile_information-4" indicates the "encryption_algorithm-C" and the "key-C."

For example, it is assumed that the devices 100-1 to 100-x sequentially perform encrypted communication by using each of the "profile_information-1" to the "profile_information-3" and, further, identification information of each of the plurality of encryption algorithms 111, identification information of each of the plurality of information generators 113, and identification information of each of the plurality of keys 115 are changed in the "profile_information-3." In this case, the plurality of encryption algorithms 111, the plurality of information generators 113 and the plurality of keys 115 are stored in the storage 110 of each of the devices 100-1 to 100-x in the same manner as shown in FIG. 7.

Therefore, even when the "profile_information-4" is used and, for example, the "profile_information-4" is "A #2, K #4," the devices 100-1 to 100-x may interpret the "profile_information-4" as indicating the "encryption_algorithm-C" and the "key-C."

However, when the device 100-y newly joins the network 200 as described above, the device 100-y cannot interpret the "profile_information-4."

Accordingly, the profile information may further include history information of the profile information.

After the device 100-y arranges and stores the plurality of keys 115, the plurality of encryption algorithms 111, and the plurality of information generators 113, for example, as shown in FIG. 7 by sequentially using the "profile_information-1" to the "profile_information-3," the device 100-y can interpret the "profile_information-4." That is, in the case that the "profile_information-4" is "A #2, K #4," the device 100-y interprets the "profile_information-4" as indicating the "encryption_algorithm-C" and the "key-C."

Meanwhile, as described above, the device 100 may include the network interface 150.

Referring to FIG. 3, the process P130 may include a process of transmitting the profile information to another device in the network 200 through the network interface 150. Referring to FIG. 5, the process P140 may include a process of receiving the profile information from the master device through the network interface 150.

The profile information may be transmitted and received between the devices 100-1 to 100-x in the network 200 through, for example, the second operation processor 170 and the second network interface 190. However, for the higher-level secure communication, it is preferable that the profile information is transmitted and received between the devices 100-1 to 100-x in the network 200 through the network interface 150.

Figure 6:
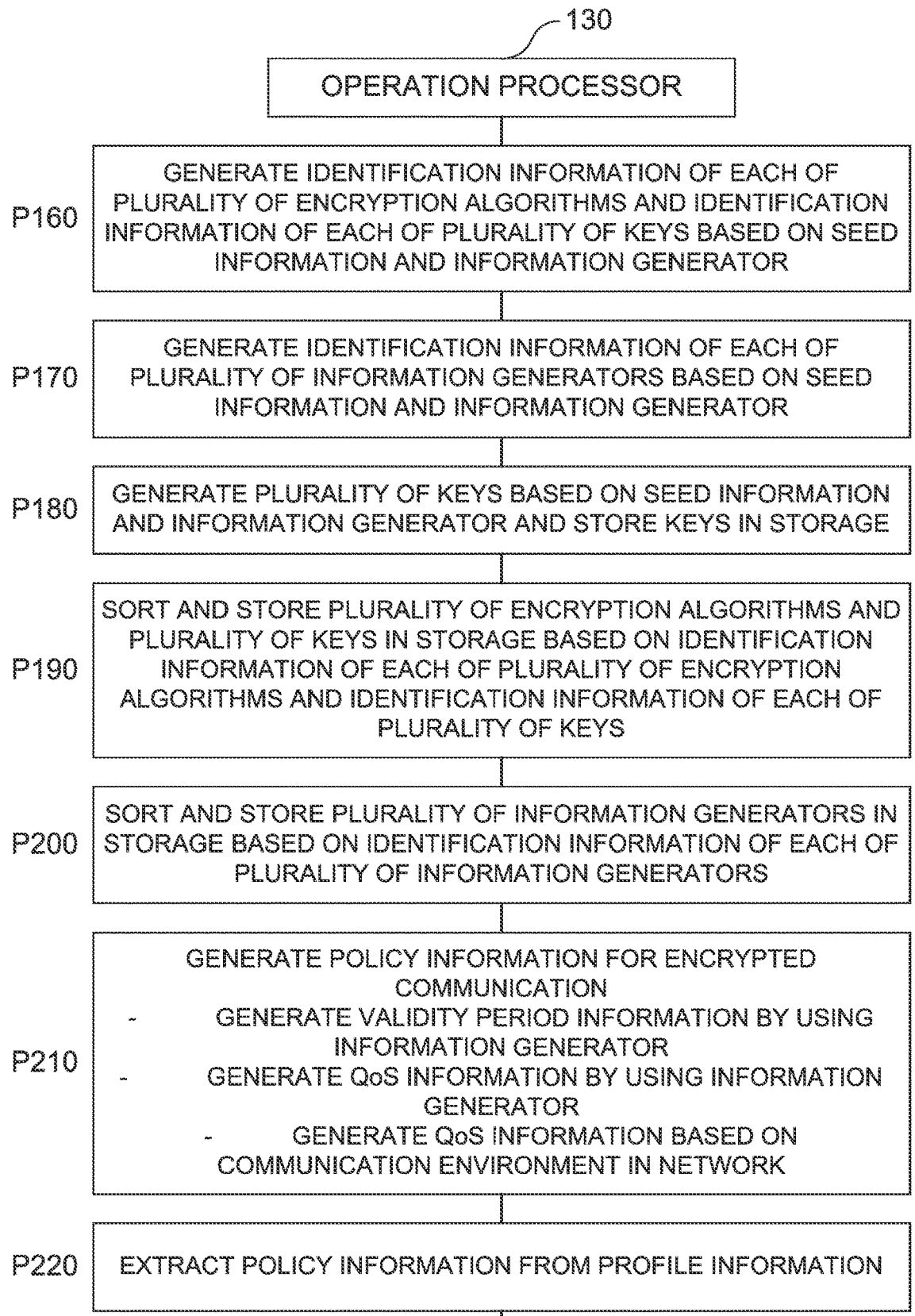
FIG. 6 is a diagram illustrating still another example of processes performed by the operation processor of the device in the network according to the exemplary embodiment of the technique of the present disclosure.
Figure 8:
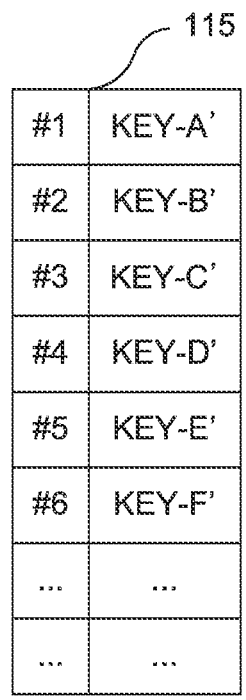
FIG. 8 is a diagram illustrating a state in which a plurality of keys are generated and stored in the storage of the device in the network according to the exemplary embodiment of the technique of the present disclosure.

FIG. 6 is a diagram illustrating still another example of processes performed by the operation processor 130 of the device 100 in the network according to the exemplary embodiment of the technique of the present disclosure. FIG. 7 is a diagram illustrating a state in which the device 100 in the network according to the exemplary embodiment of the technique of the present disclosure arranges and stores a plurality of encryption algorithms 111, a plurality of information generators 113, and a plurality of keys 115 in the storage 110 thereof based on identification information of each of the plurality of encryption algorithms 111, identification information of each of the plurality of information generators 113, and identification information of each of the plurality of keys 115. FIG. 8 is a diagram illustrating a state in which a plurality of keys 115 are generated and stored in the storage 110 of the device 100 in the network according to the exemplary embodiment of the technique of the present disclosure.

Referring to FIG. 4 or FIG. 7, the master key 117 and the history information 119 of the profile information are further stored in the storage 110.

Seed information includes, for example, at least one of the master key 117 or the history information 119 of the profile information.

The profile information may further include at least one of the master key 117 or the history information 119 of the profile information.

The master key 117 is the key that is used to generate (or derive) a key as described above. In addition, as described above, by using the master key 117, the security of the network 200 can be improved.

Referring to FIG. 6, the operation processor 130 may generate identification information of each of the plurality of encryption algorithms 111 and identification information of each of the plurality of keys 115 based on the seed information and the information generator (process P160).

In other words, as described above, the profile information includes at least one of identification information of a key, identification information of an encryption algorithm or identification information of an information generator to be used for encrypted communication.

For example, it is assumed that the "information_generator-A" is selected (that is, the device 100 operates as the master device) or the "information_generator-A," which is the information generator that generates the identification information of each of the plurality of encryption algorithms 111 and the identification information of each of the plurality of keys 115, is designated based on the identification information of the information generator included in the profile information (that is, the device 100 does not operate as the master device).

For example, when the master key is input to the "information_generator-A" as the seed information or when at least a part of the history information 119 of the profile information is input to the "information_generator-A" as the seed information, identification information of each of the plurality of encryption algorithms 111 and identification information of each of the plurality of key 115 may be generated. As for the seed information, the master key may be used at the initial state and, thereafter, at least a part of the history information 119 of the profile information may be used.

In both cases where the device 100 operates as the master device or the device 100 does not operate as the master device, the operation processor 130 uses the "information_generator-A" to generate the identification information of each of the plurality of encryption algorithms 111 and the identification information of each of the plurality of keys 115.

For example, it is assumed that, in the initial state, the plurality of encryption algorithms 111 and the plurality of keys 115 are stored in the storage of the device 100 as shown in FIG. 4 by using predetermined identification information (i.e., "#1," "#2," "#3," "#4," "#5," "#6," etc.).

If the same identification number is continuously used for each of the plurality of encryption algorithms 111 and the same identification number is continuously used for each of the plurality of keys 115, it may be vulnerable to external attacks such as hacking attacks.

In this regard, the operation processor 130 may newly generate identification information of each of the plurality of encryption algorithms 111 and identification information of each of the plurality of keys 115 through the process P160.

For example, the operation processor 130 may generate new identification numbers as shown in FIG. 7 and assign them to the plurality of encryption algorithms 111 and the plurality of keys 115.

Referring to FIG. 6, the operation processor 130 may generate identification information of each of the plurality of information generators 113 based on the seed information and the information generator (process P170).

As described above, if the same identification number is continuously used for each of the plurality of information generators 113, it may be vulnerable to external attacks such as hacking attacks.

In this regard, the operation processor 130 may newly generate identification information of each of the plurality of information generators 113 through the process P170. For example, it is assumed that the "information_generator-B" is selected (that is, the device 100 operates as the master device) or the "information_generator-B," which is the identification information generator that generates identification information of each of the plurality of information generators 113, is designated based on the identification information of the information generator included in the profile information (that is, the device 100 does not operate as the master device).

In both cases where the device 100 operates as the master device or the device 100 does not operate as the master device, the operation processor 130 may use the "information_generator-B" to generate identification information of each of the plurality of information generators 113.

For example, when the master key is input to the "information_generator-B" as the seed information or when at least a part of the history information 119 of the profile information is input to the "information_generator-B" as the seed information, identification information of each of the plurality of information generators 113 may be generated.

Accordingly, the identification information of each of the plurality of information generators 113 may be changed from the state shown in FIG. 4 to the state shown in FIG. 7, for example.

Meanwhile, if the plurality of keys 115 are repeatedly used, they may be vulnerable to external attacks such as hacking attacks.

Referring to FIG. 6, the operation processor 130 may generate the plurality of keys 115 based on the seed information and the information generator and store the generated keys 115 in the storage 110 (process P180).

For example, it is assumed that the "information_generator-C" is selected (that is, the device 100 operates as the master device) or the "information_generator-C," which is the key generator that generates the plurality of keys 115, is designated based on the identification information of the information generator included in the profile information (that is, the device 100 does not operate as the master device).

In both cases where the device 100 operates as the master device or the device 100 does not operate as the master device, the operation processor 130 may use the "information_generator-C" to generate the plurality of keys 115.

For example, when the master key is input to the "information_generator-C" as the seed information or when at least a part of the history information 119 of the profile information is input to the "information_generator-C" as the seed information, the plurality of keys 115 may be newly generated.

For example, as shown in FIG. 8, instead of the existing key-A, key-B, key-C, key-D, key-E, and key-F, a plurality of new keys 115, i.e., a key-A', a key-B', a key-C', a key-D', a key-E', and a key-F' are generated and stored in the storage 110. For example, "#1," "#2," "#3," "#4," "#5," and "#6," are respectively assigned to the new keys 115, i.e., the key-A', the key-B', the key-C', the key-D', the key-E', and the key-F' as identification information of the new keys 115. Alternatively, for example, by using the "information_generator-C" to generate the plurality of new keys 115, i.e., the key-A', the key-B', the key-C', the key-D', the key-E', and the key-F' and by inputting the master key or at least a part of the history information 119 of the profile information to the "information_generator-A" as the seed information, identification information of each the plurality of new keys 115, i.e., the key-A', the key-B', the key-C', the key-D', the key-E', and the key-F' is generated and stored in the storage 110

Referring to FIG. 6, the operation processor 130 may sort and store the plurality of encryption algorithms 111 and the plurality of keys 115 in the storage 110 based on identification information of each of the plurality of encryption algorithms 111 and identification information of each of the plurality of keys 115 (process P190).

That is, as shown in FIG. 7, the plurality of encryption algorithms 111 and the plurality of keys 115 may be rearranged based on their respective identification numbers.

Referring further to FIG. 6, the operation processor 130 may sort and store the plurality of information generators 113 in the storage 110 based on identification information of each of the plurality of information generators 113 (process P200).

That is, as shown in FIG. 7, the plurality of information generators 113 may be rearranged based on their respective identification numbers.

Referring back to FIG. 6, the operation processor 130 may generate policy information for the encrypted communication (process P210).

The policy information may include, for example, validity period information of the encrypted communication.

The validity period information may include a start time and an end time of the encrypted communication. Alternatively, the validity period information may include a start time and duration of the encrypted communication.

Referring to FIG. 6, the process P210 may include a process of generating the validity period information by using the information generator.

For example, it is assumed that the "information_generator-D" is selected (that is, the device 100 operates as the master device) or the "information_generator-D," which is the policy generator that generates validity period information, is designated based on the identification information of the information generator included in the profile information (that is, the device 100 does not operate as the master device).

In both cases where the device 100 operates as the master device or the device 100 does not operate as the master device, the operation processor 130 may use the "information_generator-D" to generate the validity period information.

For example, when the master key or at least a part of the history information 119 of the profile information is input to the "information_generator-D" as seed information, the validity period information may be generated.

It is preferable that the operation processor 130 generates the validity period information by using the "information_generator-D" only when the device 100 operates as the master device The policy information may include, for example, quality of service (QoS) information of the encrypted communication.

The QoS information may include, for example, information such as data transmission speeds (the speed of communication) between the device 100-1 to the device 100-x within the network 200.

Referring back to FIG. 6, the process P210 may include a process of generating QoS information by using the information generator.

For example, it is assumed that the "information_generator-E" is selected (that is, the device 100 operates as the master device) or the "information_generator-E," which is the policy generator that generates QoS information, is designated based on the identification information of the information generator included in the profile information (that is, the device 100 does not operate as a master device).

In both cases where the device 100 operates as the master device or the device 100 does not operate as the master device, the operation processor 130 may use the "information_generator-E" to generate the QoS information.

For example, when the master key or at least a part of the history information 119 of the profile information is input to the "information_generator-E" as seed information, the QoS information may be generated.

It is preferable that the operation processor 130 generates the QoS information by using the "information_generator-E" only when the device 100 operates as the master device.

Referring back to FIG. 6, when the device 100 operates as the master device, the process P210 may include a process of generating QoS information based on a communication environment in the network 200.

In the case where the data transmission speeds between the device 100-1 to the device 100-x in the network 200 are significantly reduced or it is necessary to lower the data transmission speeds between the device 100-1 to the device 100-x due to the presence of a device having low communication processing performance in the network 200, the operation processor 130 may generate the QoS information based on the communication environment in the network 200.

Further, the profile information may additionally include the policy information of the encrypted communication.

When the device 100 does not operate as the master device, the operation processor 130 may extract the policy information from the profile information received from the master device (process P220). In other words, the operation processor 130 may extract the policy information such as the validity period information or the QoS information from the profile information, for example.

Accordingly, the devices 100-1 to 100-x in the network 200 may perform the encrypted communication using the same policy information.

As described above, by using the profile information, the plurality of devices in the network 200 can dynamically change the encryption scheme without performing additional handshake operations, and the plurality of devices in the network 200 can easily set the policy information such as the validity period information and the QoS information. Further, the master device transmits the profile information to other devices in the network 200, so that the plurality of devices in the network 200 can easily and quickly share the profile information.

Other Embodiments

While the technique of the present disclosure is described in detail by way of the embodiments described above, the technique of the present disclosure is not limited thereto and may be modified in various ways without departing from the scope thereof.

For example, the profile information is illustrated as including at least one of identification information of an encryption algorithm, identification information of an information generator or identification information of a key. However, the profile information may include at least one of identification information of an encryption algorithm, identification information of two or more information generators or identification information of a key. At least one of a key generator or an identification information generator may be included in the two or more information generators, for example.

For example, it is assumed that the plurality of encryption algorithms 111, the plurality of information generators 113, the plurality of keys 115 and the master key 117 are stored in the storage 110 as shown in FIG. 4; the profile information is "G #3, G #1, A #2, K #4;" the profile information includes the master key 117 as seed information; the "information_generator-C" corresponding to "G #3" is the key generator that generates the plurality of keys 115; and the "information_generator-A" corresponding to "G #1" is the identification information generator that generates identification information of each of the plurality of encryption algorithms 111 and identification information of each of the plurality of keys 115.

The profile information indicates the following information.

i) The device 100 generates the plurality of keys 115 by using the "information_generator-C."

ii) The device 100 generates identification information of each of the plurality of encryption algorithms 111 and identification information of each of the plurality of keys 115 by using the "information_generator-A."

iii) The device 100 uses the "encryption_algorithm-B" corresponding to "A #2" and the "key_D" corresponding to "K #4" in encrypted communication with other devices in network 200.

By performing i) to iii), the plurality of encryption algorithms 111 and the plurality of information generators 113 are stored in the storage 110 of the device 100, for example, as shown in FIG. 7, and the plurality of keys 115 is stored in the storage 110 of the device 100, for example, as shown in FIG. 8.

As a result, "A #2" included in the profile information now indicates that the selected encryption algorithm is the "encryption_algorithm-C" as shown in FIG. 7, and "K #4" included in the profile information now indicates that the selected key is "key-D'" as shown in FIG. 8.

As such, the technique of the present disclosure may be modified in various ways without departing from the scope of the technique of the present disclosure.

Further, the technique of the present disclosure may also be applied to a communication method in the network.

The communication method in the network according to the technique of the present disclosure is performed by a device including a storage disposed in a secure zone and configured to store a plurality of encryption algorithms, a plurality of information generators, and a plurality of keys. The communication method includes, when the device operates as a master device in the network, (a) selecting, among the plurality of encryption algorithms, the plurality of information generators, and the plurality of keys, at least one of an encryption algorithm, an information generator or a key to be used for encrypted communication within the network, (b) generating profile information including at least one of identification information of the encryption algorithm, identification information of the information generator or identification information of the key, and (c) transmitting the profile information to another device among the plurality of devices in the network. The communication method further includes, when the device does not operate as the master device in the network, (d) receiving the profile information from the master device, and (e) designating, based on the profile information, at least one of the encryption algorithm, the information generator or the key to be used for the encrypted communication.

Other technical features of the device in the network according to the technique of the present disclosure can be also applied to the communication method in the network according to the technique of the present disclosure.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

According to the technique of the present disclosure, by using the profile information to be used for encrypted communication, it is possible to minimize a message transmitting process required for a handshake operation and a time required for the handshake operation, dynamically change an encryption scheme, easily change policy information such as validity period information and QoS information, and easily and quickly share the profile information between a plurality of devices in the network.

What is claimed is:

1. A device in a network where a plurality of devices are connected, the device comprising:
   a storage disposed in a secure zone and configured to store a plurality of encryption algorithms, a plurality of information generators and a plurality of keys; and
   an operation processor disposed in the secure zone,
   wherein, when the device operates as a master device in the network, the operation processor is configured to:
   (a) select, among the plurality of encryption algorithms, the plurality of information generators and the plurality of keys, at least one of an encryption algorithm, an information generator or a key to be used for encrypted communication within the network;
   (b) generate profile information including at least one of identification information of the encryption algorithm, identification information of the information generator or identification information of the key; and
   (c) transmit the profile information to another device among the plurality of devices in the network, and wherein, when the device does not operate as the master device in the network, the operation processor is configured to:
(d) receive the profile information from the master device; and
(e) designate, based on the profile information, at least one of the encryption algorithm, the information generator or the key to be used for the encrypted communication.

2. The device of claim 1, wherein, in (a), the operation processor is further configured to (a-1) select at least one of the encryption algorithm, the information generator or the key to be used for the encrypted communication based on a random number.

3. The device of claim 1, wherein, in (a), the operation processor is further configured to (a-2) select at least one of the encryption algorithm, the information generator or the key to be used for the encrypted communication based on a communication environment in the network.

4. The device of claim 1, wherein, in (c), the operation processor is further configured to (c-1) encrypt the profile information by using a predetermined initial profile, and, in (d), the operation processor is further configured to (d-1) decrypt the profile information by using the predetermined initial profile.

5. The device of claim 1, wherein the profile information further includes history information of the profile information, and, in (d), the operation processor is further configured to (d-2) analyze the profile information by using the history information of the profile information.

6. The device of claim 1, further comprising a network interface disposed in the secure zone, wherein, in (c), the operation processor is further configured to (c-3) transmit the profile information to another device among the plurality of devices in the network through the network interface, and, in (d), the operation processor is further configured to (d-3) receive the profile information from the master device through the network interface.

7. The device of claim 1, wherein the storage further stores a master key and history information of the profile information.

8. The device of claim 1, wherein the profile information further includes at least one of a master key or history information of the profile information.

9. The device of claim 1, wherein the operation processor is further configured to (f) generate identification information of each of the plurality of encryption algorithms and identification information of each of the plurality of keys based on the information generator and seed information including at least one of a master key or history information of the profile information.

10. The device of claim 1, wherein the operation processor is further configured to (g) generate identification information of each of the plurality of information generators based on the information generator and seed information including at least one of a master key or history information of the profile information.

11. The device of claim 1, wherein the operation processor is further configured to (h) generate the plurality of keys based on the information generator and seed information including at least one of a master key or history information of the profile information, and store the plurality of keys in the storage.

12. The device of claim 1, wherein the operation processor is further configured to (i) arrange and store the plurality of encryption algorithms and the plurality of keys in the storage based on identification information of each of the plurality of encryption algorithms and identification information of each of the plurality of keys.

13. The device of claim 1, wherein the operation processor is further configured to (j) arrange and store the plurality of information generators in the storage based on identification information of each of the plurality of information generators.

14. The device of claim 1, wherein the operation processor is further configured to (k) generate policy information of the encrypted communication.

15. The device of claim 14, wherein the policy information includes validity period information of the encrypted communication.

16. The device of claim 15, wherein, in (k), the operation processor is further configured to (k-1) generate the validity period information based on the information generator.

17. The device of claim 14, wherein the policy information includes quality of service (QoS) information of the encrypted communication.

18. The device of claim 17, wherein, in (k), the operation processor is further configured to (k-2) generate the QoS information based on the information generator.

19. The device of claim 17, wherein, in (k), the operation processor is further configured to (k-3) generate the QoS information based on a communication environment in the network when the device operates as the master device in the network.

20. The device of claim 1, wherein the profile information further includes policy information of the encrypted communication, and the operation processor is further configured to (l) extract the policy information from the profile information when the device does not operate as the master device in the network.

* * * * *